United States Patent [19]
Henckel

[11] Patent Number: 6,105,036
[45] Date of Patent: Aug. 15, 2000

[54] COMPUTER SYSTEM AND METHOD OF DISPLAYING A SOURCE CODE FILE WITH AN ORDERED ARRANGEMENT OF OBJECT DEFINITIONS

[75] Inventor: Jonathan David Henckel, Zumbro Falls, Minn.

[73] Assignee: International Business Machines Corporation, Armonk, N.Y.

[21] Appl. No.: 08/919,053

[22] Filed: Aug. 27, 1997

[51] Int. Cl.[7] .................................................. G06F 17/30
[52] U.S. Cl. .......................... 707/104; 345/419; 345/355
[58] Field of Search .................................. 345/329, 331, 345/339, 355, 358, 400, 419, 429, 473, 502; 709/202, 203, 217, 218, 219; 705/14, 26, 27; 382/239; 463/16; 707/104

[56] References Cited

U.S. PATENT DOCUMENTS

| | | | |
|---|---|---|---|
| 5,365,360 | 11/1994 | Torres | 348/348 |
| 5,398,312 | 3/1995 | Hoffmann | 604/218 |
| 5,428,736 | 6/1995 | Kahl et al. | 345/339 |
| 5,485,600 | 1/1996 | Joseph et al. | 395/500.34 |
| 5,586,314 | 12/1996 | Hill et al. | 707/4 |
| 5,592,668 | 1/1997 | Harding et al. | 707/2 |
| 5,737,533 | 4/1998 | De Hond | 709/219 |
| 5,894,310 | 4/1999 | Arsenault | 345/433 |
| 5,926,179 | 7/1999 | Matsuda | 345/355 |
| 5,956,039 | 9/1999 | Woods | 345/419 |
| 5,973,699 | 10/1999 | Kent | 345/419 |
| 5,999,944 | 12/1999 | Lipkin | 707/104 |

OTHER PUBLICATIONS

"EMD Enterprises 3D/VRML Products", http://www.gl-view.com/, downloaded Aug. 6, 1997.

"Creating Prewires from Graphics Language 1 for the VLSI Interactive Design Automatization System Tool Methodology", *IBM Technical Disclosure Bulletin*, vol. 38, No. 8, p. 157, (Aug. 1995).

Abstract of Ozer, J., "Totally streaming multimedia", *CD–ROM Prof.*, vol. 9, No. 8, (Aug. 1996).

Abstract of T.J. Parr, et al., "A language for creating and manipulating VRML", 1995 Symposium on the Virtual Reality Modeling Language Proceedings of 1995 VRML Workshop, (Dec. 1995).

*Primary Examiner*—Thomas G. Black
*Assistant Examiner*—Diane Mizrahi
*Attorney, Agent, or Firm*—Wood, Herron & Evans, L.L.P.

[57] ABSTRACT

A computer system and method of displaying a source code file with an ordered arrangement of object definitions of multimedia objects selectively display the object definitions in either textual or multimedia representations in response to user input. The representations are inlined within the ordered arrangement of object definitions such that a visual indication of the arrangement of such object definitions in the source code file is maintained. In addition, sets of data are selectively displayed in inlined shorthand notations within the ordered arrangement to permit a user to selectively minimize the representation of a set in a source code file, or to expand the representation of the set for viewing or editing of the specific data in the set.

38 Claims, 10 Drawing Sheets

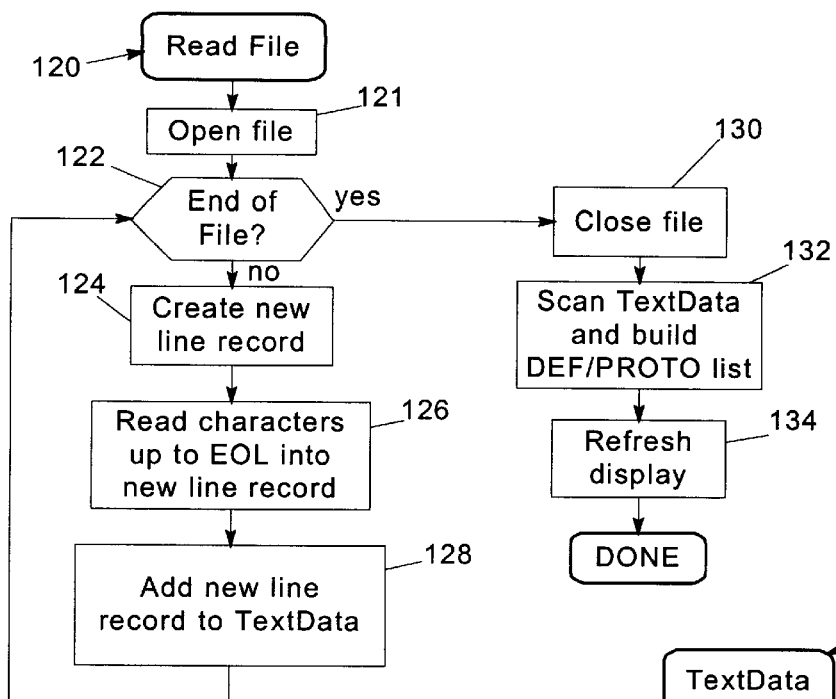
Fig. 6
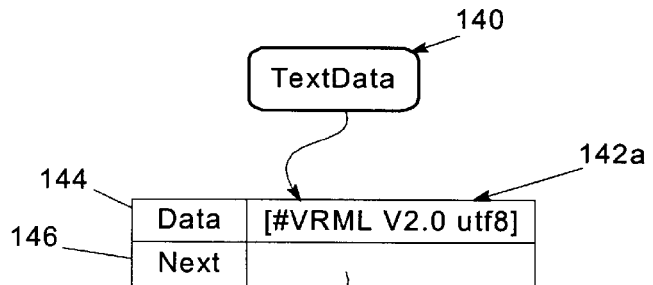
Fig. 7
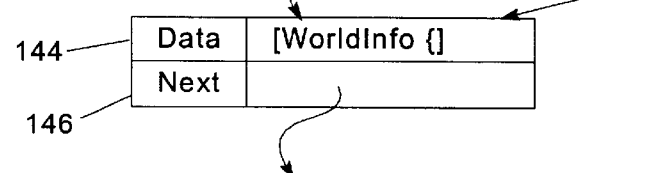
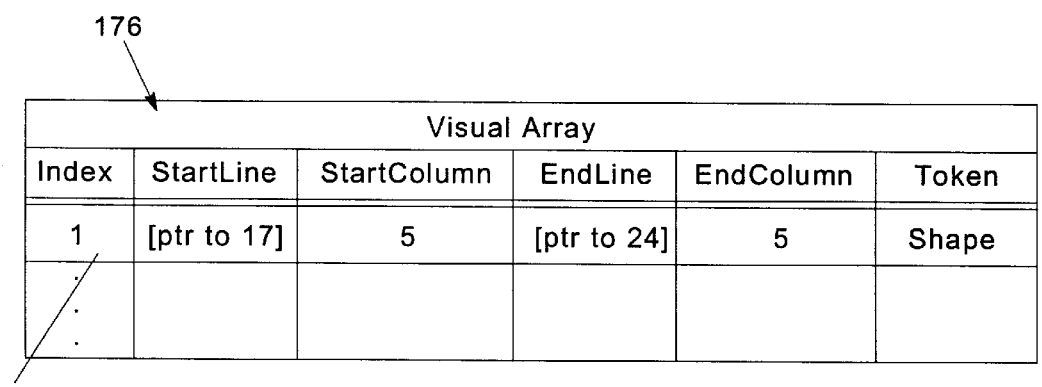
Fig. 9

|  | Shorthand Array | | | | | |
|---|---|---|---|---|---|---|
| Index | StartLine | StartColumn | EndLine | EndColumn | Elements | Kind |
| 1 | [ptr to 31] | 11 | [ptr to 32] | 42 | 4 | Vec3f |
| 248 | | | | | | |

246

COMPUTER SYSTEM AND METHOD OF DISPLAYING A SOURCE CODE FILE WITH AN ORDERED ARRANGEMENT OF OBJECT DEFINITIONS

FIELD OF THE INVENTION

The invention is generally related to computers and computer software. More specifically, the invention is generally related to a manner of displaying a source code file on a computer display.

BACKGROUND OF THE INVENTION

Software development continues to become more and more complex as computer performance increases and as greater functionality is demanded by users. Computer software programs are typically written by a computer programmer in a human-readable language, commonly referred to as source code. This source code may then later be compiled or interpreted into a set of machine-readable instructions that can be executed on a computer. Compilation of source code results in the generation of machine-readable object code that may be executed directly on a computer system. Interpreted source code is essentially compiled into machine-readable instructions on-the-fly while a computer program is executing.

One area in which source code is used extensively is in the presentation of audiovisual information to a user. For example, hypertext markup language (HTML) is used to describe the placement and formatting of text and multimedia objects in documents for presentation on a computer display. As another example, scene description languages such as the virtual reality modeling language (VRML) are used to describe interactive three dimensional scenes, or "worlds", for presentation on a computer display.

Both HTML and VRML are interpreted languages, and thus may be used on any computer system having a suitable interpreter. While each language has other uses, both HTML and VRML are particularly well-suited for transmitting information over the Internet. This is because each language can be used to generate a relatively compact program that can be used on a wide variety of computer systems. Computer software applications known as browsers are typically used to view the documents and scenes described by HTML and VRML source code.

Both HTML and VRML source code typically include one or more multimedia objects, or nodes, that are defined by object definitions. For HTML, the object definitions form an ordered arrangement of program statements. For VRML, the object definitions are organized into a hierarchical arrangement, where certain object definitions rely on the properties of child descendant object definitions in the hierarchical arrangement. The object definitions typically include one or more text statements in a HTML-specific or VRML-specific syntax.

For HTML, various text, image, sound, video and animation objects may be represented, as may embedded programs such as scripts or applets. For VRML, additional multimedia objects may be represented, including three dimensional objects, lighting objects, and event objects, among others.

Source code is typically generated by a computer programmer using a computer software application often referred to as an editor. Generally, most editors may be classified as text editors or graphical editors. Text editors enable software programmers to create source code in a text format. Graphical editors generally enable software programmers to create objects through an interactive graphical user interface (GUI) environment, and then generate source code based upon the properties of the objects.

Text editors generally have the benefit of enabling skilled programmers to exploit all of the features available in a given language, as all of the functionality of a language is directly accessible to the programmer. However, creating source code can be quite complex and time consuming, and often requires a detailed understanding of the language.

In addition, source code can be difficult to read and decipher. For example, source code written in some scene description languages such as VRML may rely on relatively large sets of data to represent coordinates, indexes, bitmap image data, sound file data, etc. Such sets can occupy several lines, or even several screens of text, particularly when complex objects are being defined. The sets of data can make it quite difficult to view and understand surrounding program statements in the source code.

Graphical editors generally attempt to hide much of the language details from the programmer by permitting objects to be created in a GUI environment, typically using graphic modeling tools similar those used in computer automated design (CAD), publishing, and illustration applications. In VRML, for example, objects may be created using graphic modeling tools, and scene or world editors may then be used to assemble the objects into scenes. Generally, the object and scene definitions are maintained in a proprietary format throughout the development process, with the source code generated as needed using an export function.

By hiding much of the detail and complexity from programmers, graphical editors often simplify and accelerate software development for many applications. However, an often necessary tradeoff to this ease of use is that some of the more advanced functions available in a language may not be accessible through a graphical editor. Consequently, each type of editor has drawbacks that often subject a programmer to certain tradeoffs when deciding upon which type of editor to use when developing source code.

In another area of software development, integrated development environment (IDE) development tools have been developed for some programming languages to facilitate software development in Windows-type environments. Many IDE tools enable graphical forms such as windows, dialog boxes, and the like to be created using GUI components. Scripted program code is associated with the components to define the operations that occur in response to user interaction with the components. Many IDE tools permit the simultaneous viewing of source code for a form and the graphical representation of the form. However, both representations are typically displayed in separate windows, making it difficult to view the overall program and to visually link together the text and graphic representations of the forms.

Consequently, a significant need continues to exist for a more powerful, efficient and intuitive manner of creating and editing source code files. Moreover, a particular need continues to exist for an improved manner of editing scene description language files such as VRML files and the like.

SUMMARY OF THE INVENTION

The invention addresses these and other problems associated with the prior art by providing in one aspect a manner of displaying a source code file in which object definitions of multimedia objects are selectively displayed in either textual or multimedia representations in response to user input. The representations are inlined within an ordered arrangement of object definitions such that a visual indication of the arrangement of such object definitions in the source code file is maintained. Often, a user is able to toggle back and forth between textual and graphical representations of the object definitions as needed to permit editing and/or viewing of the object definitions in either representation.

The invention addresses additional problems associated with the prior art by providing in another aspect a manner of displaying a source code file in which a set of data is selectively displayed in an inlined shorthand notation within an ordered arrangement of program statements. Accordingly, a user is permitted to selectively minimize the representation of a data set in a source code file, or to expand the representation of the data set for viewing or editing of the specific data in the set.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

BRIEF DESCRIPTION OF THE DRAWING

FIG. 6 is a flowchart illustrating the program flow of the read file block of FIG. 5.

FIG. 7 is a TextData data structure created by the read file block of FIG. 6.

FIG. 9 is a Visual data structure created by the node display toggle block of FIG. 8.

DETAILED DESCRIPTION

Figure 1:
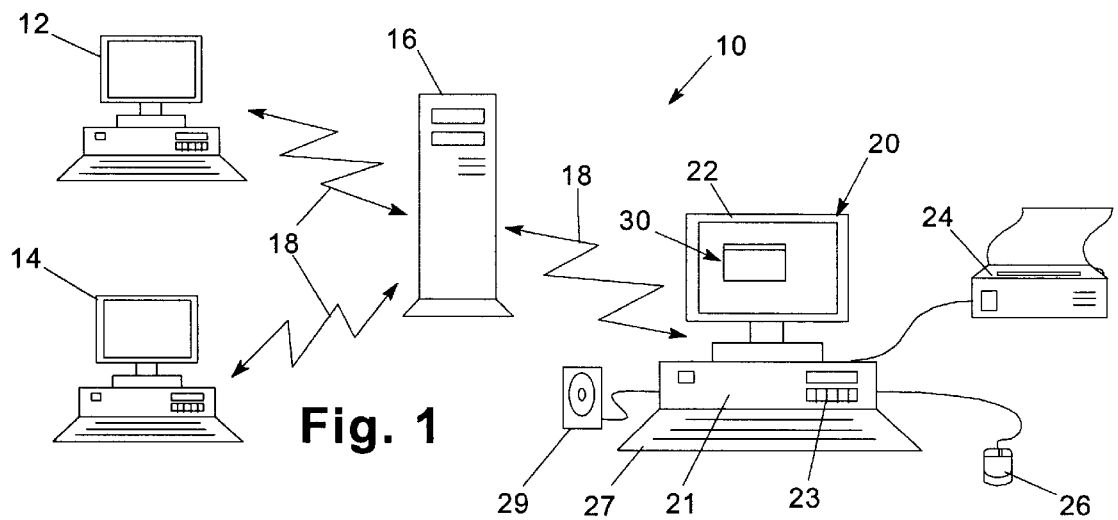
FIG. 1 is a block diagram of a computer system consistent with the invention.

Various embodiments of the invention facilitate viewing and/or editing of multimedia objects in a source file by selectively displaying the definitions of the multimedia objects in either textual or multimedia representations. Generally, a source code file includes an ordered arrangement of program statements having a syntax defined by the particular programming language used. At least a portion of the program statements form object definitions for multimedia objects. The program statements may also be in a hierarchical arrangement whereby the program statements operate as objects or nodes having descendant and/or ancestor objects or nodes, thereby defining one or more hierarchical levels.

Source code files may be in an interpreted language, whereby the program statements are interpreted during run time and converted into native instructions for the computer system upon which the source code file is being used. However, it should be appreciated that some source code files may also be compiled into intermediate or object code files prior to execution on a particular computer system.

One type of source code file suitable for use with the various embodiments of the invention is in a scene description language such as the Virtual Reality Modeling Language (VRML), which is described, for example, in the VRML 2.0 Language Specification, ISO/IEC DIS 14772-1, which is incorporated herein by reference. VRML 2.0 includes nodes that define multimedia objects such as three dimensional shapes, as well as properties thereof such as coordinates, lighting, color, texture, etc. VRML 2.0 also supports other types of multimedia objects such as images, events, videos, animation, and sounds, among others.

The discussion hereinafter will focus on VRML 2.0 source code files. However, it should be appreciated that other source code files for other interpreted or compiled programming languages may be used consistent with the invention (e.g., HTML files, among others), and thus it is not intended to limit invention to this particular application.

As discussed above, embodiments consistent with the invention selectively display object definitions in either textual or multimedia representations. A textual representation is typically in any human-readable form that is representative of and provided in the correct syntax for the particular language used. A multimedia representation, on the other hand, typically depends upon type of multimedia object defined by the object definition, e.g., two dimensional or three dimensional images and objects, animations, video clips, sound clips, etc. In addition, if a multimedia object varies over time (as with sound or video clips), suitable controls may also be incorporated into a multimedia representation to permit viewing of the object over time.

Various embodiments of the invention may also selectively display data sets, e.g., coordinates, coordinate indexes, image data, sound clip data, etc., in a shorthand notation to condense or minimize the data when it is not desirable or necessary to be able to view the data itself. As with textual and multimedia representations of the object definitions, a user may be permitted to toggle between shorthand and expanded representations of selected data sets.

Prior to discussing specific embodiments of the invention, exemplary hardware and software environments will be described. It should be appreciated that other environments may be used in the alternative.

Exemplary Hardware Environment

Turning to the Drawing, wherein like numbers denote like parts throughout the several views, a computer system 10 consistent with the invention is illustrated in FIG. 1. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include a processor such as a microprocessor 21; a number of peripheral components such as a computer display 22 (e.g., a CRT, an LCD display or other display device); storage devices 23 such as hard, floppy, and/or CD-ROM disk drives; a printer 24; various input devices (e.g., a mouse 26 and keyboard 27); and an audio system 29, among others. Computer system 20 operates under the control of an operating system, and executes various computer software applications, programs, objects, modules, etc. For example, one such computer software application is a VRML editor 30, a window of which is displayed on computer display 22. Moreover, various applications, programs, objects, modules, etc. may also execute on one or more processors in server 16 or other computer systems 12, 14, e.g., in a distributed computing environment.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, and transmission type media such as digital and analog communications links.

Those skilled in the art will recognize that the exemplary environment illustrated in FIG. 1 is not intended to limit the invention. Indeed, those skilled in the art will recognize that other alternative hardware environments may be used without departing from the scope of the invention.

Exemplary Software Environment

Figure 2:
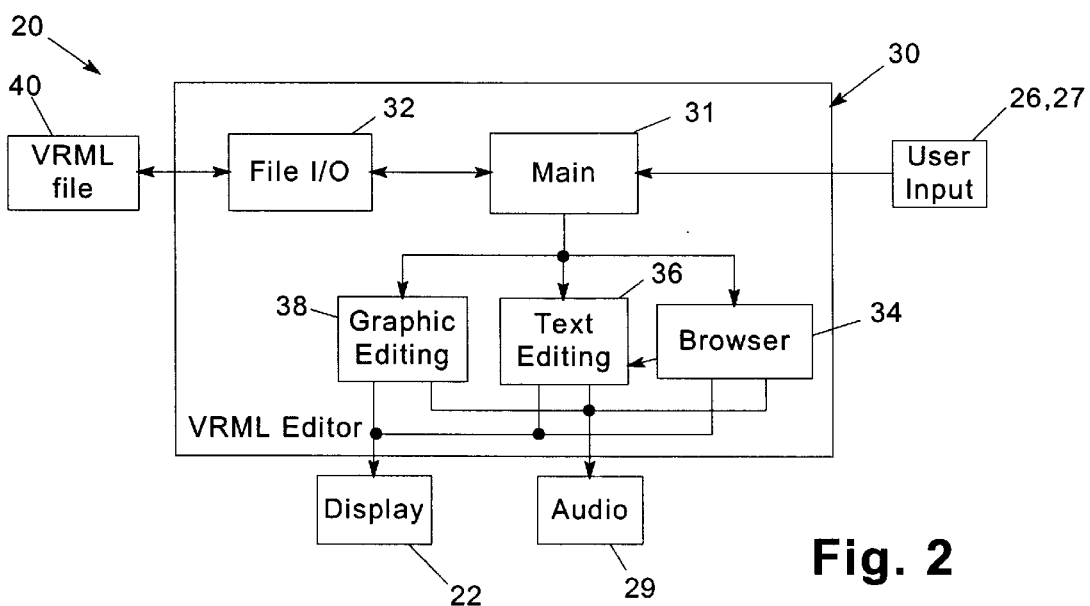
FIG. 2 is a block diagram of an exemplary software environment for the computer system of FIG. 1.

A suitable software environment for computer system 20 is illustrated in greater detail in FIG. 2. A VRML editor 30 is illustrated as receiving inputs from user input (represented by mouse 26 and keyboard 27) and a VRML source code file 40. VRML editor 30 also outputs audiovisual information to display 22 and audio system 29.

Editor 30 includes a number of functional blocks incorporating different functionality for the editor. A main block 31 controls overall operation of the editor based upon user input received from mouse 26 and keyboard 27. A file input/output block 32 handles access to VRML source file 40, and a browser 34, including, among other components, a parser and a rendering engine (not shown separately), handles graphical rendering of selected source code provided by main block 31. Browser 34 typically operates by parsing the source code provided by main block 31 to form a parse data structure such as a tree, and then utilizing the data structure to generate graphical and/or audio data for output to display 22 and audio system 29, in a manner that is well understood in the art. Main block 31 may also perform various parsing operations such as aligning program statements horizontally based upon their hierarchical level, displaying comments, statements, etc. in diff. colors, and other functions known in the art.

Editor 30 may also include both text and graphical editing functions represented by blocks 36 and 38. Text editing functions may include many of the functionality provided word processor applications and the like, including text selection, cutting and pasting, formatting, etc. Graphic editing functions may include the functionality of different known graphic modeling tools such as CAD systems, publishing applications, image editing applications, sound editing applications, etc.

It should be appreciated that other software environments may be used in the alternative. For example, the principles of the invention may be utilized on source code viewers as well as editors. Thus, the invention should not be limited to the particular environment disclosed herein.

VRML Editor

VRML editor 30 implements selective display of textual and graphical representations of object definitions, as well as selective display of expanded and shorthand notations of data sets, each of which will be discussed separately below. It should be appreciated, however, that either function may be implemented separately of the other.

The following discussion will describe the various embodiments of the invention using the following source code file, written in VRML 2.0:

TABLE I

Sample Source Code File

```
1   #VRML V2.0 utf8
2   WorldInfo {
3       title "Welcome to simple world."
4   }
5   NavigationInfo {
6       type "EXAMINE"
7   }
8   Viewpoint {
9       position 0 1.5 8
10      description "start"
11  }
12  Group {
13      children {
14          PointLight {
15              location 5 5 2
16          }
17          Shape {
18              appearance Appearance {
19                  material Material {
20                      diffuseColor 1 0 0
21                  }
22              }
23              geometry Box { }
24          }
25          Shape {
26              appearance Appearance {
27                  texture ImageTexture { url "grass.jpg" }
28              }
29              geometry IndexedFaceSet {
30                  coord Coordinate .{
31                      point [ 5 –1.05 5, 5 –1.05 –5,
32                              –5 –1.05 –5, –5 –1.05 5 ]
33                  }
34                  coordIndex [ 0, 1, 2, 3, –1 ]
35              }
36          }
37      }
38  }
```

The source code file of Table I is designated hereinafter in the Figures at reference number 40. It should be appreciated that the above source code file is merely exemplary, and that other source code files, in the same or other languages, may also be used consistent with the invention.

Hybrid Textual/Graphical Editing

Figure 3:
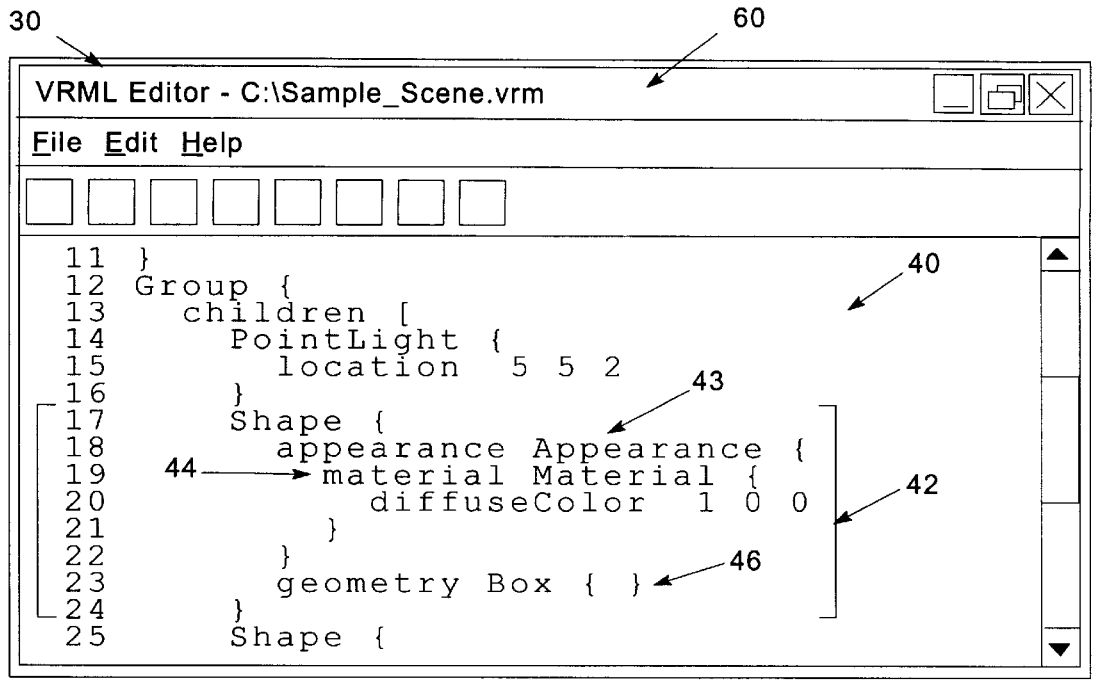
FIG. 3 is a block diagram of a representative computer display upon which is illustrated an editor window consistent with the invention, with a selected object definition displayed in a textual representation.

FIG. 3 illustrates a window 60 utilized by editor 30 and displaying a portion of the contents of source code file 40. Within source code file 40 is an object definition for a shape node 42, which is defined at line 17 and closed at line 24. It should be appreciated that node 42 includes ancestor nodes defined, e.g., at lines 12 and 13, as well as descendant nodes defined at lines 18–23. One descendant node is an appearance node 43 defined at lines 18–22, which has as its descendant a material node 44 defined at lines 19–21. Another descendant node of node 42 is a geometry node 46 defined at line 23.

Figure 4:
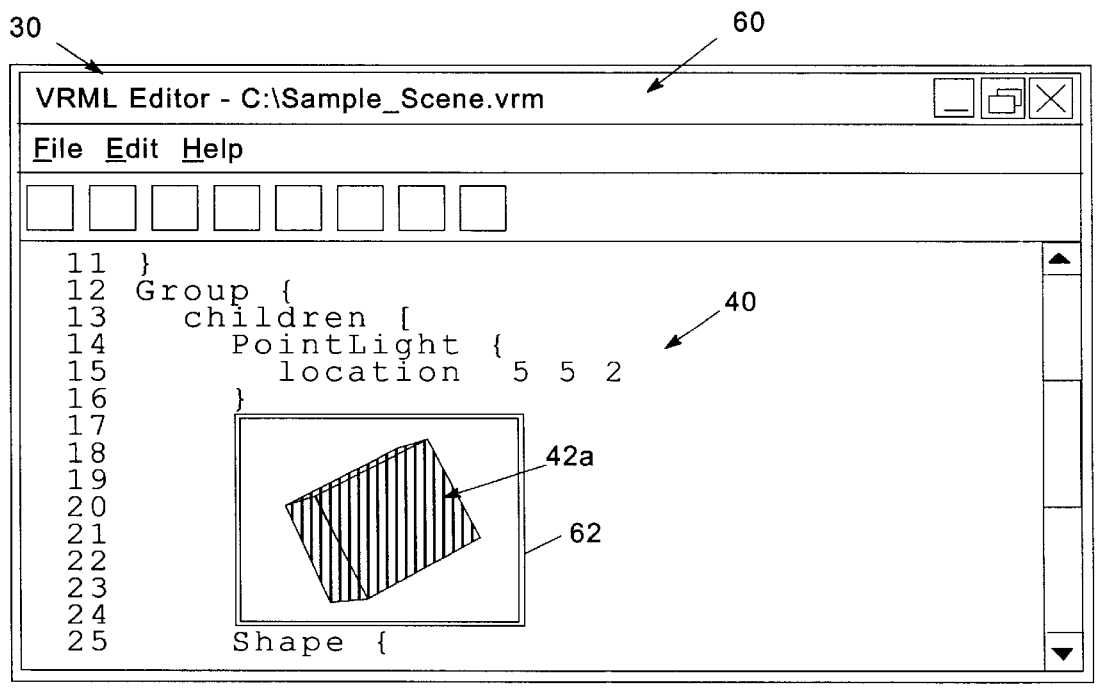
FIG. 4 is a block diagram of the computer display of FIG. 3, with the selected object definition displayed in a multimedia representation.

It should be appreciated that nodes 42–46 are all illustrated in textual representations in FIG. 3. Consistent with the invention, any or all of these nodes may be toggled to be displayed in multimedia representations. For example, as shown in FIG. 4, in response to a user input, node 42 may be toggled from a textual representation to an inlined multimedia representation 42a displayed in a panel 62. Toggling may be performed in response to user input such as a user double clicking on the node, a context menu, and other user inputs such as toolbar buttons, keystrokes, menu selections etc. Moreover, a special mode may be utilized to determine when toggling should occur in response to specific user input.

As is evident from FIG. 4, multimedia representation 42a is inlined in the display of the source code file, and specifically, displayed within the same window as the other object definitions. The multimedia representation is vertically orientated within the other object definitions to maintain the ordered arrangement thereof. Moreover, hierarchical arrangement is maintained by horizontally orienting the multimedia representation at the horizontal location of the textual representation of the same object definition. In other embodiments, horizontal orientation may not be utilized, particularly in such embodiments where no hierarchical arrangement is used.

Multimedia representation 42a may occupy the same area as the corresponding textual representation, or may be a separate size that is best suited for displaying the object. Panel 62, which may be a separate container housed within window 60, may or may not display borders to distinguish the multimedia representation from surrounding text information.

It should also be appreciated that an inlined multimedia representation of an node replaces the node as well of all of its descendants, with the properties of the descendant nodes utilized in graphically rendering the node. For example, for node 42, the appearance node 43 is utilized so that the multimedia representation has the appearance defined by the appearance node (here, a color of red). In addition, the geometry node 46 is utilized to define the shape as a box.

The inlined multimedia representation is typically generated from a viewpoint that enables a user to readily discern the object defined by the node. Rather than a fixed viewpoint, it may also be desirable to slowly move the viewpoint to display different perspectives of the object, e.g., to give the appearance of the object spinning. In other embodiments, a user may be permitted to selectively move the viewpoint similar to the camera controls provided on a conventional VRML browser.

Figure 5:
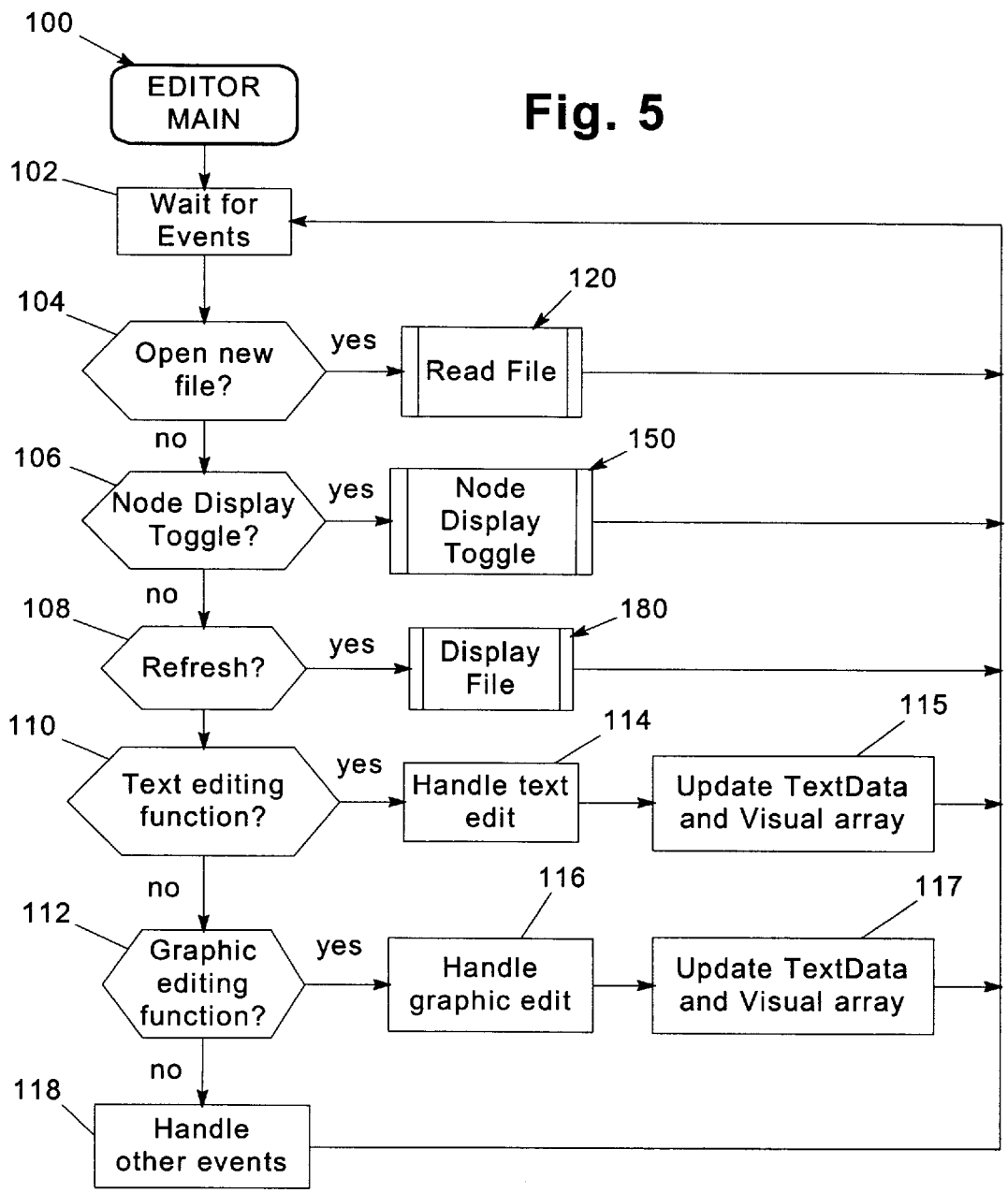
FIG. 5 is a flowchart illustrating an exemplary program flow for the VRML editor of FIG. 2.

FIG. 5 illustrates an exemplary program flow for a main routine 100 executed by main block 31 of FIG. 2. Routine 100 is shown implemented in an event driven representation. However, other programming models, e.g., procedural or object-oriented models, may be used in the alternative.

Routine 100 begins in block 102 waiting for system events, in a manner known in the art. Several events that are relevant to an understanding of the invention are represented by blocks 104–112. Handling of additional non-relevant events is represented by block 118.

One event monitored at block 104 is an open new file event that is handled by a read file routine 120 illustrated in greater detail in FIG. 6. Routine 120 begins at block 121 by opening a source code file such as source code file 40, using the resources provided by file input/output block 32 of FIG. 2. Next, block 122 determines whether the end of the source code file has been detected. If not, control passes to block 124 to create a new line record for a source code data structure, referred to herein as a TextData data structure, that stores each line of text in a source code file. All of the characters in the current line of the source code file up to an end of line (EOL) character are read into the line record at block 126. Next, the line record is added to the TextData data structure at block 128, before returning to block 122 to process the next line of the source code file.

As shown in FIG. 7, the TextData data structure may be implemented as a linked list 140 including a plurality of records, e.g., records 142a and 142b, each having a data field 144 storing the characters on a given line in the source code file, and each having a next field 146 pointing to the next record in the linked list. For example, record 142a stores the characters from line 1 of source code file 40, while record 142b stores the characters from line 2. Each data field may also include an end of line indicator such as a null character that is appended to the end of the field.

Returning to FIG. 6, each line of text in the source code file is added to the TextData data structure until an end of file character is detected at block 122. Then, block 130 is executed to close the source code file. Next, as shown in block 132, a list of definitions and prototypes may be built by scanning the TextData data structure. As will be discussed in greater detail below, definitions and prototypes may be used in the rendering of other nodes in the source code file.

Next, block 134 refreshes the display to bring up the contents of the source code file in window 60, typically by executing display file routine 180 (discussed below with reference to FIG. 10). It will be assumed for the purposes of discussion that initially all nodes are displayed in textual representations, although information relating to what nodes to display in multimedia representations may also be stored with a source code file in some embodiments.

Figure 8:
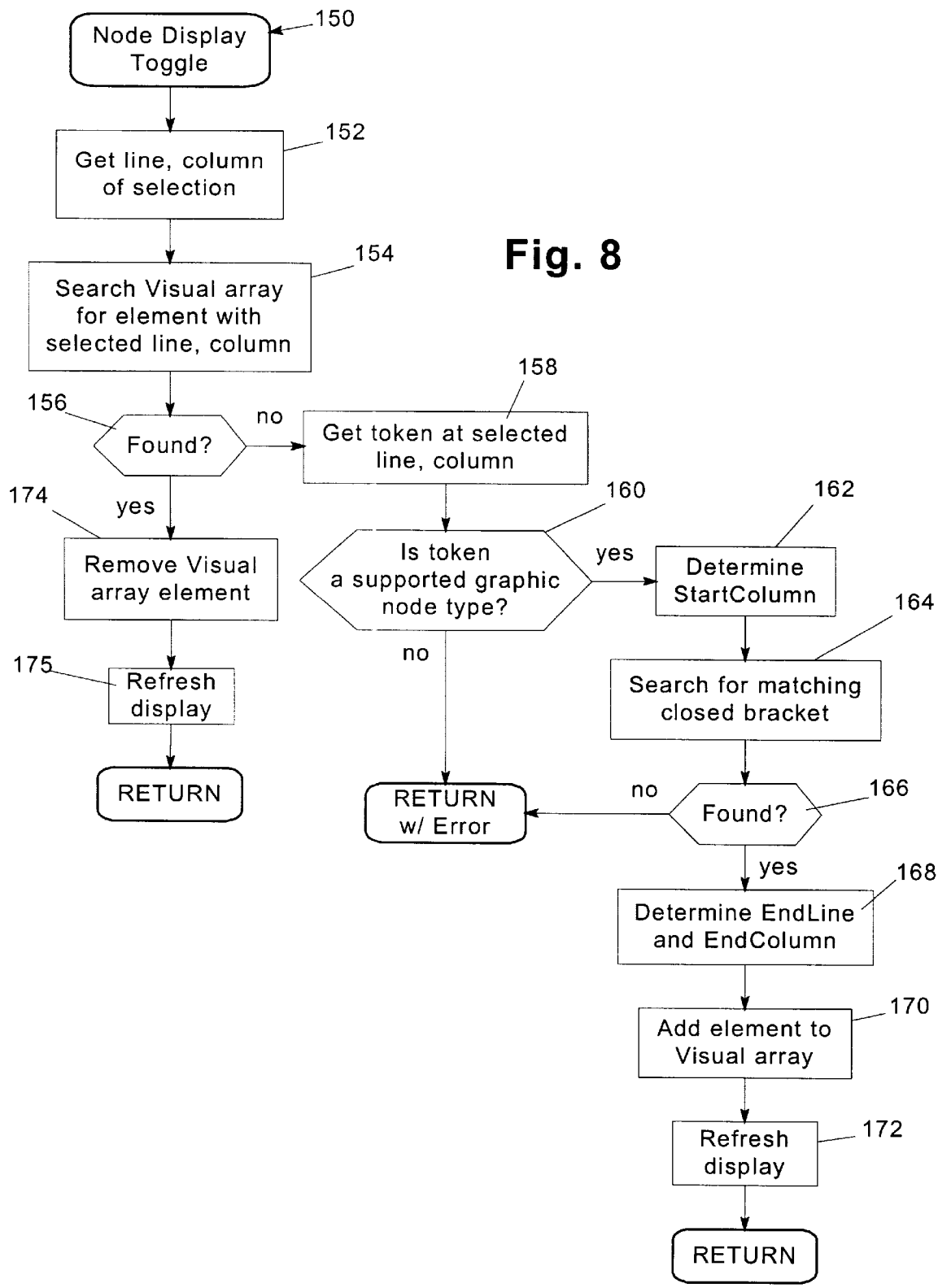
FIG. 8 is a flowchart illustrating the program flow of the node display toggle block of FIG. 5.

Returning to FIG. 5, another event processed by routine 100 is that of toggling display of a node, which is detected at block 106 and handled by a node display toggle routine 150 illustrated in greater detail in FIG. 8. First, in block 152, the line and column of the user's selection is retrieved, typically based upon the coordinates supplied with the selection event. Next, in block 154, a Visual data structure is searched to determine whether an array element in the data structure corresponds to the selected line and column.

As shown in FIG. 9, one suitable implementation of the Visual data structure is as an array 176 having a plurality of elements 178, with each element 178 corresponding to a node in the source code file that should be displayed as an inlined multimedia representation. Each element has an index identifying the element in the array, as well as StartLine and EndLine pointers that point to records in the TextData data structure, StartColumn and EndColumn values that represent specific characters in the referenced line records, and a token that is optionally includes to indicate the type of node. StartLine and StartColumn together define the beginning of a node, while EndLine and EndColumn define the end of the node.

Returning to FIG. 8, the selected line is therefore a pointer to one of the records in the TextData data structure, while the selected column relates to a specific character in the data stored in the selected line record. Whether a selected line and column corresponds to a Visual array element depends upon the particular manner of selection of a node. For example, the node token may be displayed in both representations, with selection of a node being implemented by double clicking only on the token. In the alternative, a node may be selected by clicking anywhere within the text or multimedia representation for the node. In addition, a multimedia representation may include a button or other control to determine when multimedia representation should be toggled back to text representation.

If no element matching the selected line and column is found in the Visual data structure, block 156 passes control to block 158 to retrieve the token for the node at the selected line and column. Typically, this may be performed by searching forward and backward from the selected line and column to find blank characters, with the text between the blank characters defining the token for the node. For example, as shown in FIG. 3, if a user were to select the Shape node by clicking at line 17, column 7 (the "a" in "shape"), a "shape" token would be retrieved.

Next, block 160 determines whether the retrieved token is a supported graphic node type—that is, whether a multimedia representation is available for the node. If not, an error is signaled and the routine is terminated. If so, control passes to block 162 to determine the StartColumn for the node, which is typically the first letter of the token. Next, block 164 searches forward through the TextData data structure to find the matching closed bracket for the node that indicates the end of the node. If not successful, block 166 signals an error and terminates the routine. If successful, however, block 168 sets EndLine and EndColumn to the line and column for the end of the node. Next, block 170 adds an element to the Visual array data structure using the line within which the token is found as StartLine, with the StartColumn, EndLine, EndColumn and Token as determined above. Next, the display is refreshed at block 172 and the routine terminates.

Returning to block 156, if a Visual array element is found corresponding to the selected line and column, block 174 is executed to simply remove the array element from the Visual array. The display is then refreshed at block 175 before the routine is termnninated.

As an example, selection of node 42 in FIG. 3 would result in array element 178 being added to Visual array data structure 176 (FIG. 9), with a StartLine pointing to line 17, a StartColumn of 5, an EndLine pointing to line 24, an EndColumn of 5, and a token of "Shape". Similarly, selection of multimedia representation 42a in FIG. 4 would result in array element 178 being removed from Visual array 176.

Figure 10:
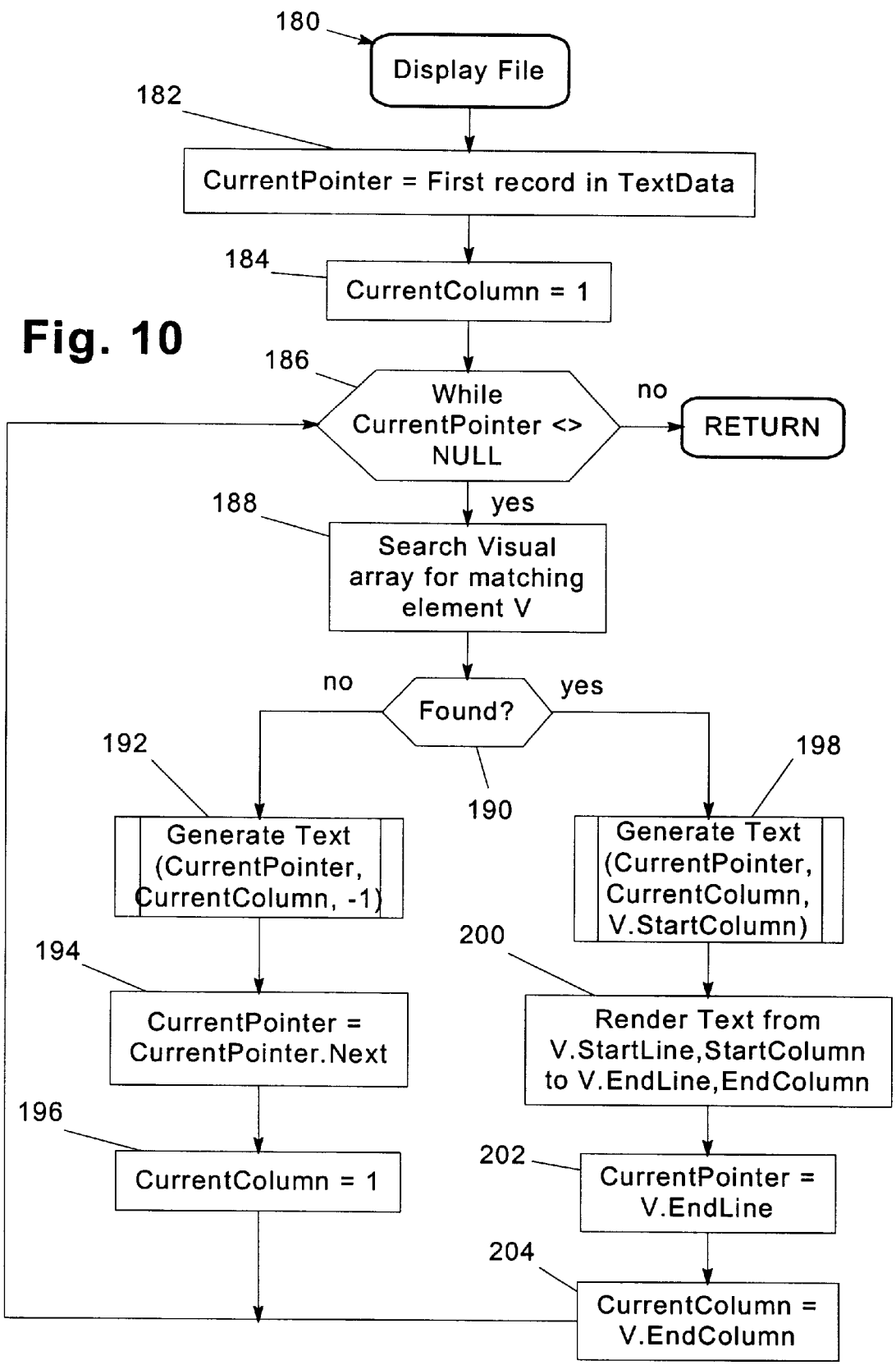
FIG. 10 is a flowchart illustrating the program flow of the display file block of FIG. 5.

Returning again to FIG. 5, another event processed by routine 100 is that of refreshing the display, which is detected at block 108 and handled by a display file routine 180 illustrated in greater detail in FIG. 10. Routine 180 is illustrated as rendering the entire source code file, although it should be appreciated that only a portion thereof may be displayed in a given window at one time. It should also be appreciated that only portion of file may be rendered at a time in the alternative to speed execution of the editor.

First, in blocks 182 and 184, a CurrentPointer pointer is set to the first record in the TextData data structure, and a CurrentColumn value is set to the first column, or the first character in the first TextData record. Next, block 186 executes a while loop that executes until all of the records in the TextData data structure have been displayed.

The while loop begins in block 188 by searching the Visual array for a matching element, designated V. A matching element has a StartLine pointer that points to the same TextData record as CurrentPointer, and a StartColumn that is greater than or equal to CurrentColumn. If more than one element in the Visual array is matching, the element with the smallest StartColumn is returned.

Next, if a matching element is not found, block 190 passes control to block 192 to call a Generate Text routine to display the characters in the current line record from CurrentColumn to the end of the line record (represented by a −1 value). The Generate Text routine may simply output the specified characters from the data field of the current record. In the alternative, the Generate Text routine may also include a provision for handling shorthand notations, as discussed below with respect to FIG. 23.

Next, blocks 194 and 196 respectively set the CurrentPointer to the next line record in the TextData data structure, and the CurrentColumn to the first column in the next line record. Control is then returned to block 186 to process the next line record.

Returning to block 190, if a matching element is found, control is passed to block 198 to call the Generate Text routine to display the characters in the current line record from CurrentColumn to V.StartColumn, the starting column stored in the matching array element. Next, block 200 graphically renders the textual information in the source code file between StartLine, StartColumn and EndLine, EndColumn. Typically, this is performed by generating a secondary VRML source code file and passing the secondary file through browser 34 to render the node within a panel in the window. A panel is generated with an upper left corner at StartLine, StartColumn, and extending the full vertical extent of the node. In the alternative, the horizontal and/or vertical spacing and size of the panel may be completely independent of the position and size of the textual representation of the object definition.

Typically, the viewpoint is selected to provide a useful view of the node. For example, a viewpoint may be selected by setting the z-coordinate to double the largest dimension of the node, with the x- and y-coordinates set to the middle of the node. However, other viewpoints may be better suited for viewing other nodes.

For example, for node 42, block 200 may generate the source code file shown below in Table II:

TABLE II

Sample Secondary Source Code File

1  #VRML V2.0 utf8
2  NavigationInfo { type "EXAMINE" }
3  Viewpoint { position 0 0 4 }
4  Shape {
5      appearance Appearance {
6          material Material {
7              diffuseColor 1 0 0
8          }
9      }
10     geometry Box { }
11 }

After rendering of the node, blocks 202 and 204 respectively set CurrentPointer and CurrentColumn to the end position of the node, specifically, to V.EndLine and V.EndColumn. Control then returns to block 186 to continue display of the remaining nodes in the source code file.

Returning once again to FIG. 5, text and graphical editing events are detected, respectively, at blocks 110 and 112. Text events are handled in block 114 in a manner that is known in the art, generally by utilizing the functions available in block 36 of FIG. 2. Next, in block 115, the TextData and Visual data structures are updated, which is often necessary since the location of text may change in response to modifications to the source code file.

Graphical events are also handled in block 116 in a manner that is known in the art, generally by utilizing the functions available in block 38 of FIG. 2. In addition, the TextData and Visual data structures may be updated following an editing operation as shown in block 117.

Editing may be performed inline, and directly within the panel in which the object definition is rendered. In the alternative, graphical editing of an object definition may be performed in a separate window. Moreover, graphical editing may be performed using the functions within editor 30, or may be performed in other applications. As an example, an Object Linking and Embedding (OLE) object may be embedded into the source code file, whereby editing would be performed in a separate application. In addition, some multimedia objects, e.g., sounds, images, and videos, may be edited using specific applications designed for such purposes. In general, practically any known graphical and multimedia modeling and editing tools may be used consistent with the invention.

Figure 11:
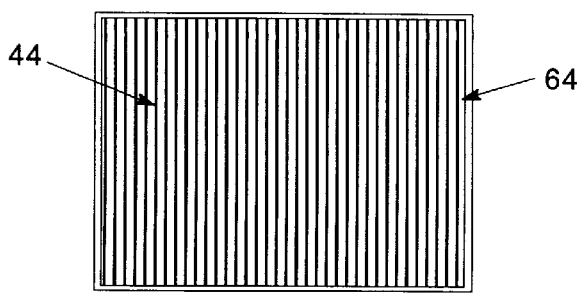
FIG. 11 is a block diagram of a panel illustrating a multimedia representation of the color object definition shown in FIG. 3.
Figure 13:
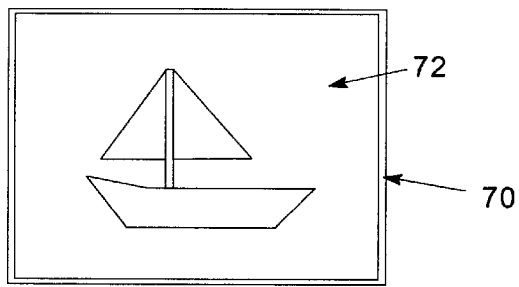
FIG. 13 is a block diagram of a panel illustrating a multimedia representation of an image object definition.

It should be appreciated that the above-described editor may be suitable for displaying a wide variety of multimedia objects in either textual or multimedia representations. For example, FIG. 11 illustrates a panel 64 that is a multimedia representation of Material node 44 of FIG. 3. In this representation, the material, here the color red, is displayed in the panel. This type of multimedia representation may be suitable for illustrating other node properties, e.g., for Appearance nodes, Background nodes, ImageTexture nodes and PixelTexture nodes, among others. Panel 70 of FIG. 13, for example, shows a multimedia representation of an ImageTexture node 72.

A node property node may be represented merely by showing the property filling the entire panel (as in FIG. 11), or may instead show a default object with the display property applied. For example, a unit box may be displayed with the specific properties for the node applied thereto. To render an appearance node, for example, the following program code may be generated:

TABLE III

Appearance Node Secondary Source Code File

1  #VRML V2.0 utf8
2  NavigationInfo { type "EXAMINE" }
3  Viewpoint { position 0 0 4 }
4  Shape {
5      appearance Appearance { . . . display properties . . . }
6      geometry Box { }
7  }

Figure 12:
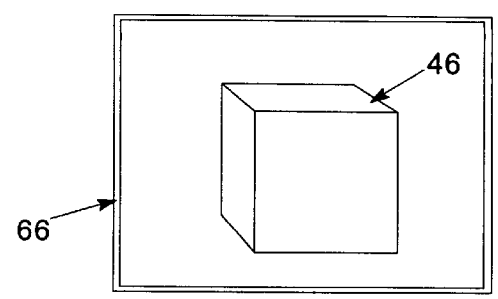
FIG. 12 is a block diagram of a panel illustrating a multimedia representation of the geometry object definition shown in FIG. 3.

Another type of object that may be displayed by editor 30 is a geometry node, such as geometry node 46 displayed in panel 66 of FIG. 12. With a geometry node, a three dimensional rendering or wireframe rendition of an object may be displayed with default appearance properties (e.g., gray with no texture). A wide variety of geometry objects may be rendered, including Cone nodes, Cylinder nodes, ElevationGrid nodes, Extrusion nodes, IndexedFaceSet nodes, IndexedLineSet nodes, PointSet nodes, Sphere nodes, and Text nodes, among others. To render node 46, for example, the following program code may be generated:

TABLE IV

Geometry Node Secondary Source Code File

1  #VRML V2.0 utf8
2  NavigationInfo { type "EXAMINE" }
3  Viewpoint { position 0 0 4 }
4  Shape {
5      appearance Appearance {material Material { } }
6      geometry Box { }
7  }

Figure 14:
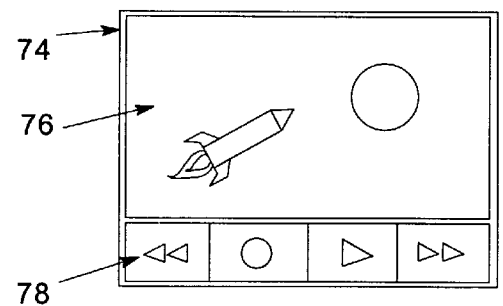
FIG. 14 is a block diagram of a panel illustrating a multimedia representation of a video or animation object definition.
Figure 15:
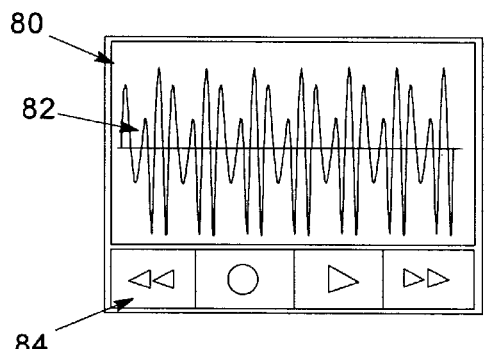
FIG. 15 is a block diagram of a panel illustrating a multimedia representation of a sound object definition.

Another type of object is a video or animation node, such as a MovieTexture node 76 displayed in panel 74 of FIG. 14. Videos and animations are time varying, and therefore, it may be desirable to include suitable controls 78 (e.g., play, stop, rewind, fast forward) to enable viewing of an object.

Figure 16:
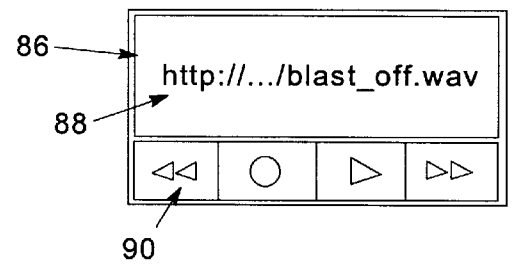
FIG. 16 is a block diagram of a panel illustrating an alternate multimedia representation of the audio object definition of FIG. 15.

Similarly, a sound object may be displayed by editor 50, such as an AudioClip node 82 displayed in panel 80, and with controls 84. A graphic rendering of the audio clip waveform may be provided in addition to the controls. In the alternative, as shown in FIG. 16, an AudioClip node 88 may be displayed in panel 86 with controls 90 and a description of the node rather than the waveform therefor. The description in this instance may be a location or source for the audio clip file. FIG. 16 also illustrates that generally any multimedia representation may also include text description and/or labels in lieu of or in addition to multimedia information.

Other sound objects, e.g., Sound nodes, may be displayed, e.g., with a graphical rendering of a spatial ellipsoid of the sound. For example, one graphical rendering may draw maxBack/Front as a gray filled ellipse on black background, with a white filled ellipse used to draw minBack/Front, and with the sound location designated by an object such as a red dot.

Figure 17:
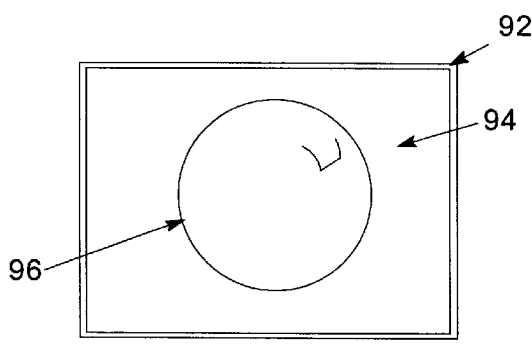
FIG. 17 is a block diagram of a panel illustrating a multimedia representation of a lighting object definition.
Figure 18:
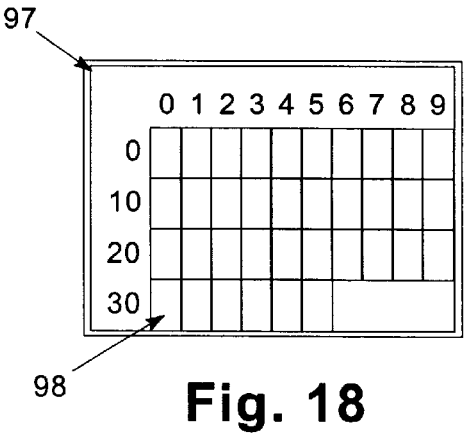
FIG. 18 is a block diagram of a panel illustrating a multimedia representation of a color palette object definition.

Any number of additional nodes may also be displayed in editor 30, dependent upon type of source code file for which editor 30 is used. For example, as shown in FIG. 17, a panel 92 may illustrate a PointLight node 94 with a default object such as a sphere 96 shadowed in accordance with the node properties. As another example, as shown in FIG. 18, a panel 97 may illustrate a VRML Color node 98 having a palette of available colors.

Other VRML nodes that may be displayed include, but are not limited to, group nodes such as Anchor nodes, Billboard nodes, Collision nodes, Group nodes, and Transform nodes, as well as multiple group nodes, e.g., Switch nodes and Level of Detail (LOD) nodes. For these latter nodes, only one of a plurality of collections are displayed at a time. Consequently, a suitable collection selector control may also be provided on a panel to switch between collections. For a Switch node, the control may be a spin button used to toggle between collections. For an LOD node, the control may be a real number representing the distance from a viewpoint to the group of nodes. In the alternative, automatic collection selection may be performed as a user varies the viewpoint in the panel.

Other nodes may or may not be supported by VRML editor 30. For example, some nodes may not have meaningful multimedia representations, and thus it may not be desirable to support such nodes.

Various modifications may be made to editor 30 consistent with the invention. For example, as discussed above with respect to block 132 of FIG. 6, it may be desirable to maintain a list of definitions and prototypes so that when a node that uses a definition or prototype (e.g., DEF, PROTO, EXTERNPROTO statements), the referenced definition or prototype may be located and accessed to control the properties of the multimedia representation of the node. To implement this functionality, each line record may be scanned for prototypes and definitions, with an array similar to the Visual array being created to define the extents of each prototype or definition. A token field, identifying the prototype or definition, may also be included in the array. Consequently, during rendering of a node (e.g., at block 200 of FIG. 10), detection of a label that matches an element in the prototype/definition array permits the properties defined in the matching prototype or definition to be used in rendering the node.

Moreover, it may be desirable to permit USE statements to be selectable by a user to inline the referenced multimedia definition within a node as if it were actually a descendant of the node.

As another alternative, editor 30 may be implemented in an object oriented system where each type of node is represented by a separate subclass of a node class, with each node in a source code file including an instance of the appropriate subclass, pointers to each descendant node thereof, and a flag indicating whether a given node is to be displayed in a textual or multimedia representation. Each instance may have a toggleMe( ) method to toggle the flag for the node. Each instance may also have a displayMe( ) method that accesses the flag for the node and recursively calls the displayMe( ) method for each descendant node to either output text or to graphically render the node.

Other modifications will be apparent to one skilled in the art.

Shorthand Representation of Data Sets

Figure 19:
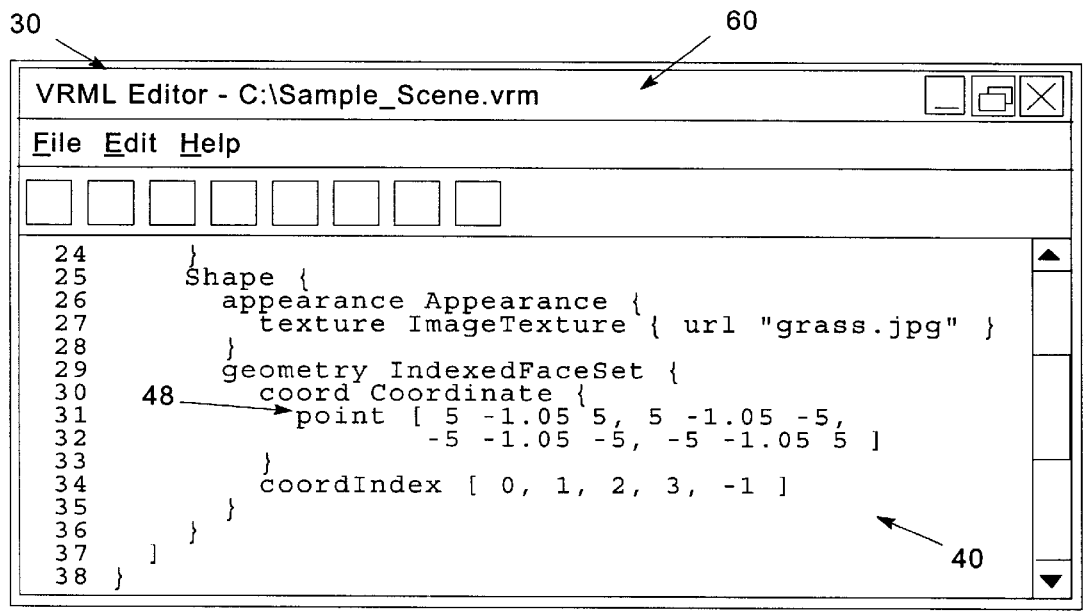
FIG. 19 is a block diagram of the editor window of FIG. 3, with a data set displayed in an expanded representation.
Figure 20:
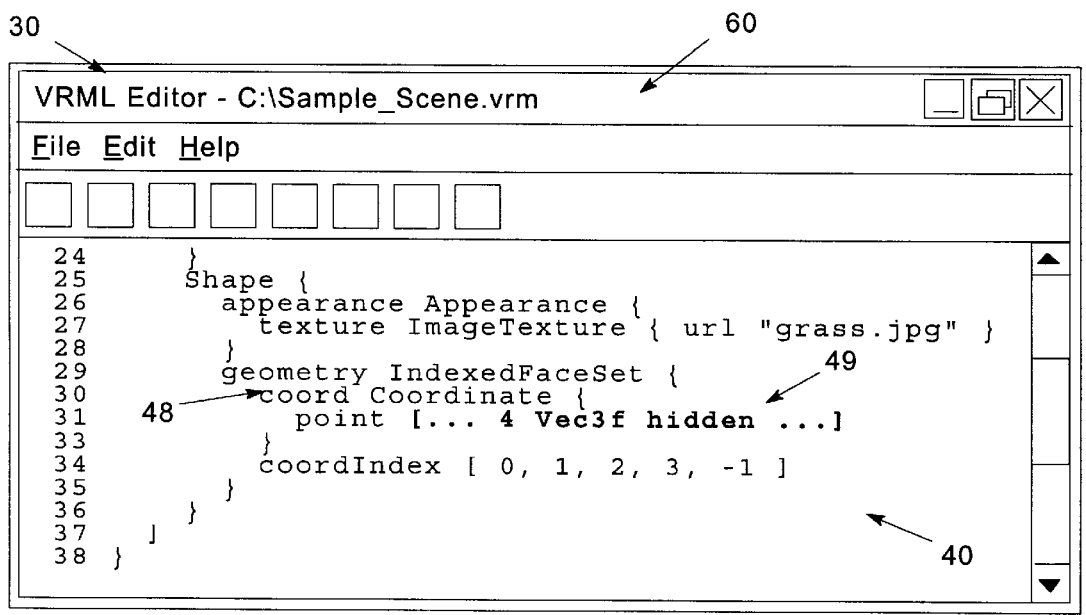
FIG. 20 is a block diagram of the editor window of FIG. 19, with the data set displayed in a shorthand representation.

As discussed above, another function implemented by editor 30 is that of selectively displaying data sets in expanded or shorthand notation. For example, FIG. 19 shows another portion of source code file 40 displayed in window 60 of editor 30. A Coordinate node 48 includes an array or set of four points (having datatypes of Vec3f) defined on lines 31 and 32 of source code file 40. It may be desirable, however, to condense the area required to display the points, e.g., using a shorthand notation (e.g., "[. . . 4 Vec3fhidden . . . ]") as shown in FIG. 20. In particular, some objects may require tens or hundreds of points that may occupy multiple lines or even multiple pages of a source code file. Such points are rarely, however, edited once they are input. Consequently, the ability to represent such sets in shorthand notation may significantly increase the readability of a source code file.

Practically any set of data points may be represented in a shorthand notation, e.g., coordinates, coordinate indexes, bitmap data, and sound file data, among others. The data points may represent numerical data, as well as text and other alphanumeric data. Moreover, data points in a set may define objects or other data structures (e.g., VRML nodes). Other datatypes may also be used in the alternative.

For VRML, for example, a data set can generally be defined by the statement:

[MFType, MFType, . . . , MFType]

where MFType may be any of the datatypes listed below in Table V (among others):

TABLE V

| MFType | VRML Datatypes Description |
|---|---|
| Float | real number |
| Int32 | integer |
| Vec2f | pairs of float |
| Vec3f | triples of float |
| Rotation | quadruples of float |
| String | string in double quotes |
| Node | VRML node |

A shorthand notation may include an identifier that identifies that a set of data has been condensed. In addition a shorthand notation may include an indicator of the number of hidden elements. Moreover, a shorthand notation may simply display elements at each end of a set, with ellipses therebetween. For example, one suitable shorthand notation for VRML is "[. . . x MFTypes hidden . . . ]." Other suitable notations may be used in the alternative.

Figure 21:
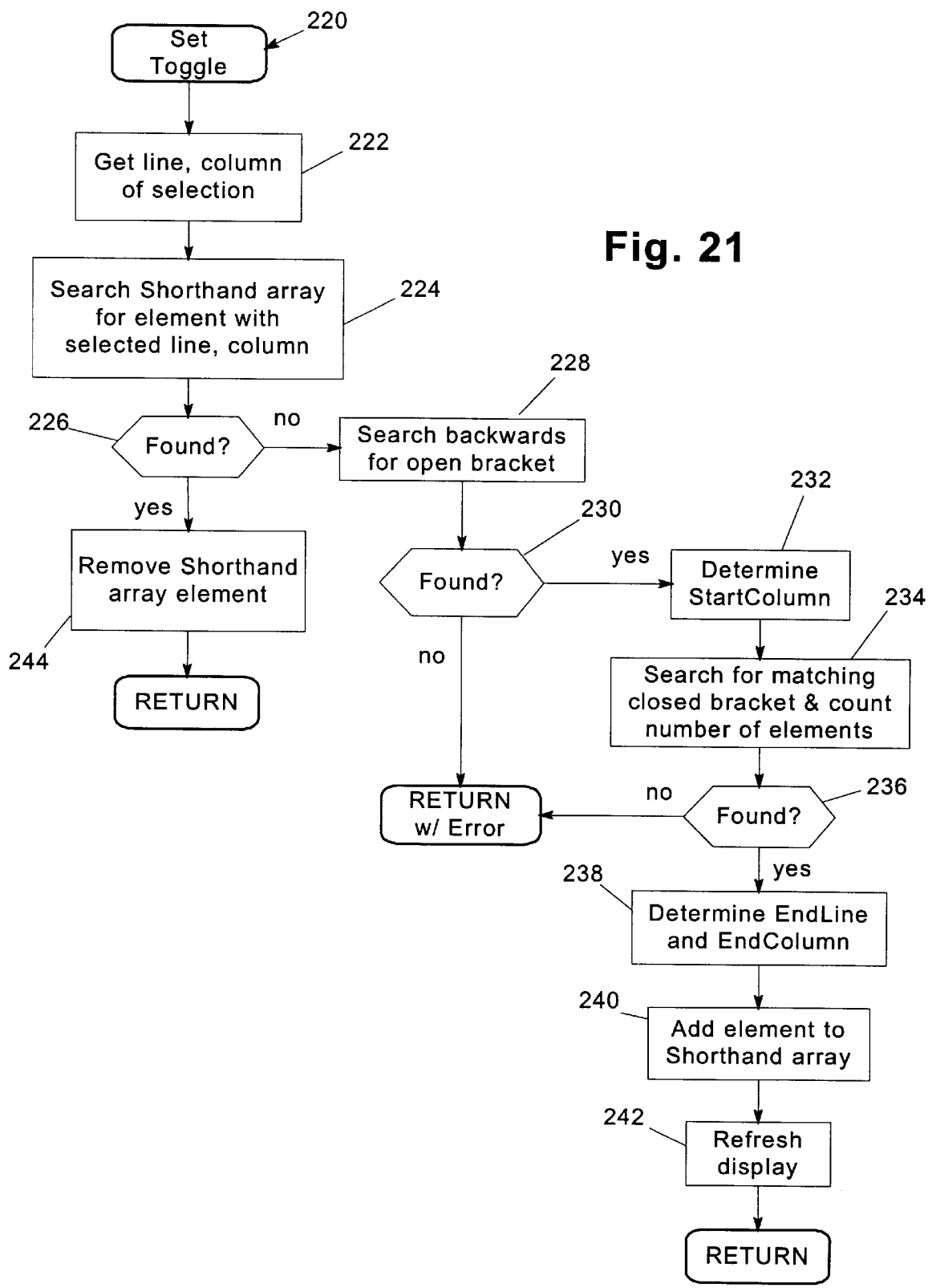
FIG. 21 is a flowchart illustrating the program flow of a set toggle block consistent with the invention.

FIG. 21 illustrates a set toggle routine 220 that may be called in response to a set toggle event detected (but not shown) in main routine 100 of FIG. 5. A set toggle event may be initiated in any of the manners described above for toggling representation of an object definition, e.g., by double clicking on a shorthand or expanded notation of a data set. Moreover, the sets that may be displayed in shorthand may be limited to only those having at least a predetermined number of elements, a number that may also be selectable by a user. Routine 220 closely follows the program flow of node display toggle routine 150.

Figures 22, 23:
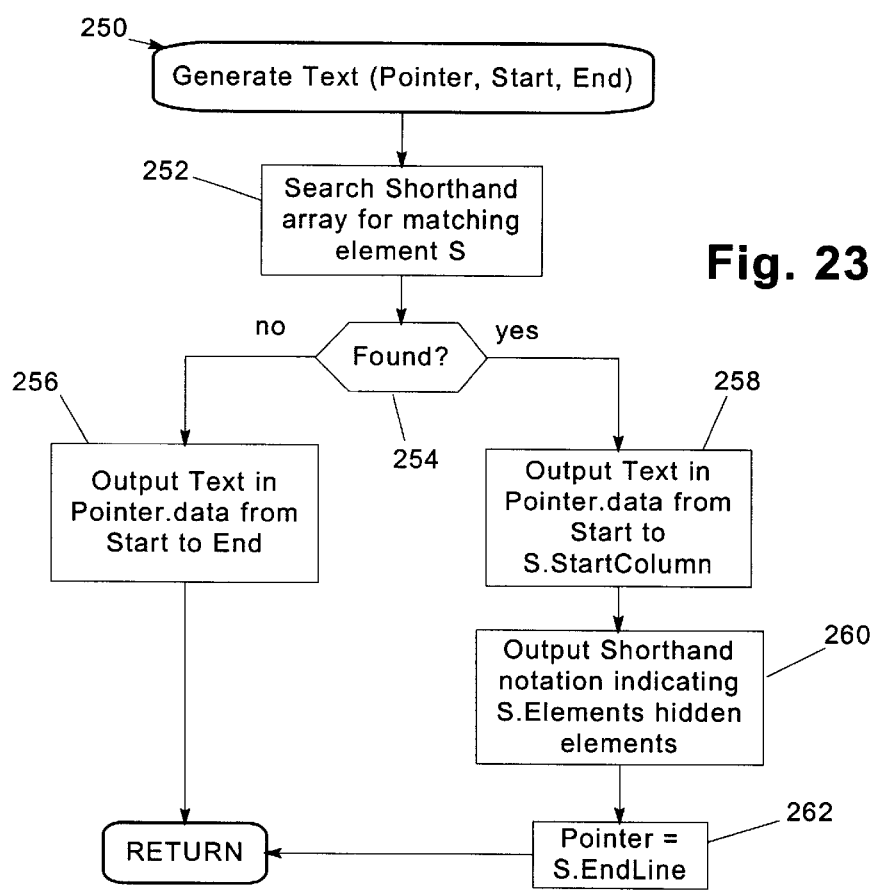
FIG. 22 is a Shorthand data structure created by the set toggle block of FIG. 21.
FIG. 23 is a flowchart illustrating one suitable program flow for the generate text block of FIG. 10, with a provision for displaying data sets in shorthand representations.

First, in block 222, the selected line and column are retrieved from the event information, and in block 224, a Shorthand data structure is searched to determine if any element corresponds to the selected line and column. FIG. 22 illustrates one suitable implementation of Shorthand data structure is an array 246 having a plurality of elements 248, each of which includes an index, StartLine, StartColumn, EndLine, and EndColumn, as well as an Elements field that indicates the number of elements in the set and a Kind field that indicates the datatype of the set.

Returning to FIG. 21, a matching element is detected when the selected line and column fall between StartLine, StartColumn and EndLine, EndColumn of an array element. If such an array element is not found, block 226 passes control to block 228 to search backwards from the selected line and column for the open bracket representing the beginning of the set. Block 230 then determines if the open bracket is found.

If the open bracket is not found an error is returned. However, if the open bracket is found, the StartColumn is determined in block 232 as the beginning of the data set (e.g., the open bracket).

Next, block 234 searches for a matching closed bracket, while maintaining a count of the number of elements in the set. Counting elements may require searching for commas delimiting the elements, as well as determining the datatype of the set (e.g., commas delimiting every two floating point numbers define Vec2f data points, while commas delimiting every three floating point numbers define Vec3f data points). On the other hand, given that VRML does not distinguish between commas and whitespace, it may be necessary to separately determine the context of the set in the source code file (e.g., through analyzing surrounding tokens) to determine the number of individual numbers in each data point, as well as the datatype therefor.

Next, in block 236, if the closed bracket cannot be found, an error is returned. However, if the closed bracket is found, control passes to block 238 to set EndLine and EndColumn to the line and column of the closed bracket, respectively. Next, an element is added to the Shorthand array in block 240, including the StartLine determined from the line of the open bracket, as well as the StartColumn, EndLine, EndColumn and Elements calculated as discussed above. Next, the display is refreshed in block 242 and the routine terminates.

A Generate Text routine 250 callable by routine 180 of FIG. 10 and suitable for selectively displaying shorthand or expanded notations is illustrated in FIG. 23. Routine 250 receives as input parameters a Pointer variable that points to the current TextData line record for which to generate text, as well as Start and End values representing the start and end characters to display in the line record.

Routine 250 begins in block 252 by searching the Shorthand array for a matching element, designated S. A matching element has a StartLine pointer that points to the same TextData line record as Pointer, and a StartColumn that is greater than or equal to Start. If more than one element in the Visual array is matching, the element with the smallest StartColumn is returned.

If a matching element is not found, block 254 passes control to block 256, where the characters from Start to End in the data field of the current line record are output. Execution of the routine is then complete.

If a matching element is found, block 254 passes control to block 258, where the characters from Start to the beginning column of the matching element, S.StartColumn, are output. Next, block 260 outputs a shorthand notation indicating the number of elements stored in the matching element, S.Elements.

Next, in block 262, the Pointer variable is set to point to the ending line record in the matching array element, S.EndLine. Consequently, display of the remaining nodes in the source code file continues from the end of the data set in the manner disclosed above with respect to FIG. 10.

Various additional modifications may be made to the described embodiments without departing from the spirit and scope of the invention. Therefore, the invention lies solely in the claims hereinafter appended.

What is claimed is:

1. A method of displaying on a computer display a source code file including an ordered arrangement of a plurality of object definitions that define a plurality of multimedia objects, the method comprising:

(a) displaying at least a portion of the plurality of object definitions in first representations on the computer display; and (b) in response to user input, selectively displaying on the computer display, in place of the first representation of a selected object definition, an inlined multimedia representation of the selected object definition disposed at a relative location of the selected object definition in the ordered arrangement.

2. The method of claim 1, wherein the first representation of each object definition is a textual representation.

3. The method of claim 1, wherein the source code file is written in a hierarchical scene description language, wherein the ordered arrangement defines a plurality of hierarchical levels, with each object definition arranged at one of the plurality of hierarchical levels.

4. The method of claim 3, wherein the source code file is written in a virtual reality modeling language (VRML).

5. The method of claim 3, wherein displaying the portion of object definitions includes arranging the first representations of the object definitions horizontally based upon the hierarchical levels thereof, and wherein selectively displaying the inlined multimedia representation of the selected object definition includes arranging the inlined multimedia representation horizontally based upon the hierarchical level of the selected object definition.

6. The method of claim 1, wherein the plurality of object definitions define multimedia objects selected from the group consisting of shapes, colors, textures, coordinates, videos, animations, sounds, images and combinations thereof.

7. The method of claim 1, wherein the selected object definition defines a three dimensional shape, and wherein selectively displaying the selected object definition includes animating the inlined multimedia representation to display different perspectives of the three dimensional shape defined by the selected object definition.

8. The method of claim 1, wherein selectively displaying the selected object definition includes displaying at least one user control selectable by a user to control the display of the inlined multimedia representation.

9. The method of claim 1, further comprising editing the selected object definition in response to user manipulation of the inlined multimedia representation.

10. The method of claim 1, further comprising toggling between display of the first representation and the inlined multimedia representation of the selected object definition in response to a user double-clicking on either of the first and inlined multimedia representations.

11. The method of claim 1, further comprising parsing the source code file to form a parse tree including a plurality of nodes, each node associated with one of the plurality of object definitions, and each node including a display indicator indicating whether to display the first representation or the inlined multimedia representation of the object definition associated therewith, wherein selectively displaying the inlined multimedia representation includes accessing the display indicator for each node.

12. The method of claim 1, wherein displaying the object definitions includes displaying the first representations of the object definitions within a window, and wherein selectively displaying the selected object definition includes displaying the inlined multimedia representation of the selected object definition within a panel in the window.

13. The method of claim 1, wherein the source code file further includes at least one set of data interposed therein, the method further comprising, in response to user input, selectively displaying a shorthand notation of the set of data on the computer display.

14. A computer system configured to display a source code file to a user, the source file including an ordered arrangement of a plurality of object definitions that define a plurality of multimedia objects, the computer system comprising:
 (a) a computer display; and
 (b) a processor, coupled to the computer display, the processor configured to display at least a portion of the plurality of object definitions in first representations on the computer display; and in response to user input, to selectively display on the computer display, in place of the first representation of a selected object definition, an inlined multimedia representation of the selected object definition disposed at a relative location of the selected object definition in the ordered arrangement.

15. The computer system of claim 14, wherein the first representation of each object definition is a textual representation.

16. The computer system of claim 14, wherein the source code file is written in a hierarchical scene description language, wherein the ordered arrangement defines a plurality of hierarchical levels, with each object definition arranged at one of the plurality of hierarchical levels.

17. The computer system of claim 16, wherein the source code file is written in a virtual reality modeling language (VRML).

18. The computer system of claim 16, wherein the processor is further configured to arrange the first representations of the object definitions and the inlined multimedia representation horizontally based upon the hierarchical levels of the object definitions.

19. The computer system of claim 14, wherein the plurality of object definitions define multimedia objects selected from the group consisting of shapes, colors, textures, coordinates, videos, animations, sounds, images and combinations thereof.

20. The computer system of claim 14, wherein the selected object definition defines a three dimensional shape, and wherein the processor is configured to animate the inlined multimedia representation to display different perspectives of the three dimensional shape defined by the selected object definition.

21. The computer system of claim 14, wherein the processor is further configured to edit the selected object definition in response to user manipulation of the inlined multimedia representation.

22. The computer system of claim 14, wherein the processor is further configured to toggle display between the first representation and the inlined multimedia representation of the selected object definition in response to a user double-clicking on either of the first and inlined multimedia representations.

23. The computer system of claim 14, wherein the processor includes a browser configured to parse the source code file to form a parse tree including a plurality of nodes, each node associated with one of the plurality of object definitions, and each node including a display indicator indicating whether to display the object definition associated therewith or the inlined multimedia representation therefor, wherein the processor is configured to access the display indicator for each node when selectively displaying the inlined multimedia representation.

24. A program product, comprising:
 (a) a program configured to perform a method of displaying on a computer display a source code file including an ordered arrangement of a plurality of object definitions that define a plurality of multimedia objects, the method comprising:
  (1) displaying at least a portion of the plurality of object definitions in first representations on the computer display; and
  (2) in response to user input, selectively displaying on the computer display, in place of the first representation of a selected object definition, an inlined multimedia representation of the selected object definition disposed at a relative location of the selected object definition in the ordered arrangement; and
 (b) a signal bearing media bearing the program.

25. The program product of claim 24, wherein the signal bearing media comprises a recordable type media.

26. The program product of claim 24, wherein the signal bearing media comprises transmission type media.

27. A method of displaying on a computer display a hierarchical scene description language source code file including a plurality of object definitions that define a plurality of multimedia objects in a scene, the method comprising:
 (a) determining a hierarchical arrangement of the plurality of object definitions according to the hierarchical scene description language; and
 (b) selectively displaying a portion of the plurality of object definitions on the computer display, including displaying each object in the portion of object definitions in either a textual representation or an inlined multimedia representation while maintaining the hierarchical arrangement thereof.

28. A method of displaying on a computer display a source code file, the source code file including an ordered arrangement of program statements and at least one set of data interposed therein, the method comprising:
 (a) displaying the ordered arrangement of program statements on the computer display; and
 (b) in response to user input, selectively displaying a shorthand notation of the set of data on the computer display at the relative location thereof in the ordered arrangement of program statements.

29. The method of claim 28, wherein the set of data is selected from the group consisting of graphic coordinates, image data, texture data, and combinations thereof.

30. The method of claim 28, wherein selectively displaying the shorthand notation includes displaying the number of elements in the set.

31. The method of claim 28, wherein selectively displaying the shorthand notation includes displaying ellipses.

32. The method of claim 28, wherein selectively displaying the shorthand notation is performed only when the set of data has greater than a predetermined number of elements.

33. The method of claim 28, wherein selectively displaying the shorthand notation includes toggling between the shorthand notation and an expanded notation of the set of data in response to user input.

34. The method of claim 33, wherein toggling is performed in response to a user double-clicking on the shorthand notation and the expanded notation.

35. A computer system configured to display a source code file to a user, the source code file including an ordered arrangement of program statements and at least one set of data interposed therein, the computer system comprising:

(a) a computer display; and (b) a processor, coupled to the computer display, the processor configured to display the ordered arrangement of program statements on the computer display; and in response to user input, to selectively display a shorthand notation of the set of data on the computer display at the relative location thereof in the ordered arrangement of program statements.

36. A program product, comprising:

(a) a program configured to perform a method of displaying on a computer display a source code file, the source code file including an ordered arrangement of program statements and at least one set of data interposed therein, the method comprising:

(1) displaying the ordered arrangement of program statements on the computer display; and (2) in response to user input, selectively displaying a shorthand notation of the set of data on the computer display at the relative location thereof in the ordered arrangement of program statements; and (b) a signal bearing media bearing the program.

37. The program product of claim 36, wherein the signal bearing media comprises a recordable type media.

38. The program product of claim 36, wherein the signal bearing media comprises transmission type media.

* * * * *